(12) United States Patent
Doi et al.

(10) Patent No.: US 11,964,290 B2
(45) Date of Patent: Apr. 23, 2024

(54) COMPRESSED-FLUID DISCHARGE CONTROL DEVICE

(71) Applicant: SMC CORPORATION, Chiyoda-ku (JP)

(72) Inventors: Yoshitada Doi, Koshigaya (JP); Hiroaki Sasaki, Moriya (JP); Masayuki Oshima, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 336 days.

(21) Appl. No.: 17/275,423

(22) PCT Filed: Sep. 12, 2018

(86) PCT No.: PCT/JP2018/033873
§ 371 (c)(1),
(2) Date: Mar. 11, 2021

(87) PCT Pub. No.: WO2020/054000
PCT Pub. Date: Mar. 19, 2020

(65) Prior Publication Data
US 2022/0048050 A1  Feb. 17, 2022

(51) Int. Cl.
*B05B 1/30* (2006.01)
*B05B 12/08* (2006.01)

(52) U.S. Cl.
CPC .......... *B05B 1/3006* (2013.01); *B05B 12/088* (2013.01)

(58) Field of Classification Search
CPC ... B05B 1/3006; B05B 12/088; B05B 1/3053; B05B 1/306; B05B 1/005; B05B 1/30;
(Continued)

(56) References Cited

U.S. PATENT DOCUMENTS 4,477,051 A * 10/1984 Ben-Yehuda ......... F16K 31/145
251/30.01
5,118,072 A *  6/1992 Sakamoto ............. F16K 31/402
251/30.02
(Continued)

FOREIGN PATENT DOCUMENTS

CN       1327133 A    12/2001
CN    201090776 Y     7/2008
(Continued)

OTHER PUBLICATIONS

Extended European Search Report dated Mar. 24, 2022 in European Patent Application No. 18933642.3, 8 pages.
(Continued)

*Primary Examiner* — Qingzhang Zhou
(74) *Attorney, Agent, or Firm* — Oblon, McClelland, Maier & Neustadt, L.L.P.

(57) ABSTRACT

In a compressed-fluid discharge control device, there are formed a valve chamber communicated with a discharge channel and supply channels for supplying a compressed fluid, and a pilot chamber into which the compressed fluid is introduced from the supply channels. A diaphragm valve for communicating or cutting off communication of the supply channels and the discharge channel seats on or separates from a valve seat provided in the valve chamber. Pilot channels through which a compressed fluid supplied to the pilot chamber passes are formed in the diaphragm valve. The compressed-fluid discharge control device has a pilot chamber opening/closing valve for opening or closing the pilot chamber. The pilot chamber opening/closing valve includes a solenoid valve which is opened in response to energization thereof and closed in response to de-energization thereof.

6 Claims, 8 Drawing Sheets

(58) Field of Classification Search
CPC . B05B 9/04; Y02P 70/10; F16K 1/523; F16K 31/402; B08B 5/02
See application file for complete search history.

(56) References Cited

U.S. PATENT DOCUMENTS

| | | | |
|---|---|---|---|
| 2001/0032946 A1 | 10/2001 | Dickman et al. | |
| 2008/0029725 A1 | 2/2008 | Ito et al. | |
| 2017/0248974 A1* | 8/2017 | Ok | G05D 7/0635 |

FOREIGN PATENT DOCUMENTS

| | | |
|---|---|---|
| CN | 201344281 Y | 11/2009 |
| CN | 102297276 A | 12/2011 |
| CN | 102345543 A | 2/2012 |
| CN | 103925390 A | 7/2014 |
| CN | 104344057 A | 2/2015 |
| JP | 55-158368 U | 11/1980 |
| JP | 62-62077 U | 4/1987 |
| JP | 10-132137 A | 5/1998 |
| JP | 10-165844 A | 6/1998 |
| JP | 2001-304436 A | 10/2001 |
| JP | 2005-246356 A | 9/2005 |
| JP | 2005-291493 A | 10/2005 |
| JP | 2008-39083 A | 2/2008 |
| JP | 2009-275747 A | 11/2009 |
| JP | 2014-83518 A | 5/2014 |
| JP | 2016-75377 A | 5/2016 |

OTHER PUBLICATIONS

Notice of Reasons for Refusal dated May 10, 2022 in Japanese Patent Application No. 2020-546608 (with English machine translation), 12 pages.
Cambined Chinese Office Action and Search Report dated Dec. 27, 2021 in Chinese Patent Application No. 201880097437.8 (with unedited computer generated English translation), 12 pages.
Combined Chinese Office Action and Search Report dated Jul. 18, 2022 in Chinese Patent Application No. 201880097437.8 (with unedited computer generated English translation), 12 pages.
Korean Office Action dated Aug. 26, 2022 in Korean Patent Application No. 10-2021-7010755 (with unedited computer generated English translation), 9 pages.
International Search Report dated Dec. 11, 2018 in PCT/JP2018/033873 filed on Sep. 12, 2018, 2 pages.
Indian Office Action dated Jul. 19, 2021 in Indian Patent Application No. 202147016505, 6 pages.

* cited by examiner

COMPRESSED-FLUID DISCHARGE CONTROL DEVICE

TECHNICAL FIELD

The present invention relates to compressed-fluid discharge control devices that control discharge of compressed fluid.

BACKGROUND ART

In machining, cutting powder or chip powder of metal produced during cutting process adheres to surfaces of workpieces. In order to remove such powder and clean the surfaces of the workpieces, blasting compressed fluid (mainly compressed air) is widely performed. Compressed-fluid discharge control devices used for performing such blasting (blowing) include, for example, gun-shaped tools disclosed in Japanese Laid-Open Patent Publication Nos. 2005-246356 and 2014-083518. Gun-shaped compressed-fluid discharge control devices of this type, which are often called "air blow guns", "fluid blow guns", or "discharge guns", are expressed as "air blow guns" in the description below.

This type of air blow gun includes a housing including a handle gripped by an operator and a lever rotatably attached to the housing. When the operator pushes the lever toward the handle using their fingers, an opening and closing valve disposed between a supply channel and a discharge channel formed inside the handle opens, and thereby the supply channel and the discharge channel communicate with each other. This causes compressed air supplied from a compressed-air supply source to the supply channel to flow into the discharge channel and then to be discharged from an opening (discharge port) in the discharge channel.

SUMMARY OF INVENTION

As described above, the operator needs to grip the lever to perform blast of air using the air blow gun. That is, the operator needs to operate the air blow gun at a worksite where blast of air is performed. Thus, in a case where the operator needs to operate the air blow gun in a place where, for example, water sprays all over, the operator disadvantageously gets wet.

A principal object of the present invention is to provide a compressed-fluid discharge control device capable of being opened and closed electrically without manual opening and closing operation directly performed by an operator.

Another object of the present invention is to provide a compressed-fluid discharge control device also capable of being opened and closed remotely.

According to an aspect of the present invention, a compressed-fluid discharge control device configured to control discharge of compressed fluid includes
   a valve chamber provided with a seat and configured to communicate with a supply channel through which the compressed fluid is supplied and a discharge channel having a discharge port through which the compressed fluid is discharged,
   a diaphragm valve including a pilot path and configured to block communication between the supply channel and the discharge channel by being seated on the seat and to establish the communication by being separated from the seat, and
   a pilot-chamber opening and closing valve configured to open and close a pilot chamber into which the compressed fluid is introduced from the supply channel via the pilot path, wherein
   the pilot-chamber opening and closing valve includes a solenoid valve configured to be opened when energized and to be closed when de-energized, and
   when the pilot-chamber opening and closing valve is opened to open the pilot chamber, the diaphragm valve is separated from the seat, and thereby the supply channel and the discharge channel communicate with each other.

In the present invention, a solenoid valve is used as the pilot-chamber opening and closing valve for opening and closing the pilot chamber to open and close the diaphragm valve. The diaphragm valve can be opened by energizing the solenoid valve to open the pilot chamber and can be closed by de-energizing the solenoid valve to close the pilot chamber. That is, an operator does not need to perform opening and closing operation at a worksite. Thus, even in a case where water sprays all over the worksite, the operator is prevented from getting wet.

Moreover, this structure enables a control switch for opening and closing the solenoid valve to be disposed in a place away from the solenoid valve. In this case, the solenoid valve and the diaphragm valve can be opened and closed remotely, thereby preventing the operator from getting wet by water spray and the like more reliably.

In addition, in this structure, compressed fluid that has reached a valve chamber flows into the discharge channel all at once and is discharged from an open end (discharge port) of the discharge channel. Thus, an instantaneous high discharge pressure (peak pressure) can be obtained immediately after the start of discharge. Such instantaneous discharge of compressed fluid at a high discharge pressure can easily bring, for example, objects at rest into a state of motion. This improves the efficiency in removing chips, dust, and other particles. Moreover, the peak pressure can be obtained without discharging a large amount of compressed fluid. This results in a reduction in the consumption of compressed fluid and thus leads to energy savings.

It is preferable that a storage chamber configured to store compressed fluid be disposed between the supply channel and the valve chamber. In this case, compressed fluid that has been stored in the storage chamber in advance flows into the discharge channel all at once as the diaphragm valve opens. As a result, even higher discharge pressure can be easily obtained. As a matter of course, the efficiency in removing the chips, dust, and other particles is further improved in this case.

In the case where the storage chamber is provided, the storage chamber may be configured as a variable-volume inner chamber of which volume can be changed. This enables the upper limit of the discharge pressure (peak pressure) of compressed fluid to be set according to the uses of the device.

Moreover, in the case where the storage chamber is provided, it is preferable that a regulating valve configured to adjust the flow rate of compressed fluid introduced from the supply channel into the storage chamber be provided. In this case, for example, the flow rate of the compressed fluid introduced into the storage chamber can be set small by reducing the opening degree of the regulating valve. In a case where the diaphragm valve is still open after the discharge at the high discharge pressure ends, compressed fluid passes through the storage chamber, reaches the discharge channel, and is discharged at a low pressure. That is, blowing at a low pressure can be continued.

In general, kinetic frictional force that acts on an object in motion is smaller than static frictional force that acts on an object at rest. Consequently, once chips and dust are subjected to a high discharge pressure and brought into a state of motion, the chips and dust can be maintained in the state of motion even with a low discharge pressure. As a result, removal of such foreign substances can be continued.

Furthermore, it is preferable that the pilot-chamber opening and closing valve be configured to establish and block communication between the pilot chamber and the discharge channel. In this case, when the pilot chamber is opened, the compressed fluid inside the pilot chamber flows into the discharge channel. That is, the compressed fluid inside the pilot chamber can also be discharged and used to remove the dust and the like. This results in a further increase in the peak pressure immediately after the start of discharge and, in addition, leads to more energy savings.

Reducing the stroke of the diaphragm valve further increases the response speed. That is, the peak pressure can be obtained immediately after the operator operates an operating member for opening and closing. To achieve this, it is preferable that a contact member displaceable relative to a valve element of the diaphragm valve be provided to limit the displacement of the valve element by coming into contact with the valve element. That is, a displacement limiting unit may be provided.

In this case, further displacement of the valve element is stopped by the contact of the contact member with the valve element. The opening degree at a point in time when the displacement is stopped is defined as the maximum opening degree of the diaphragm valve. In this manner, the maximum opening degree of the diaphragm valve can be made smaller than the designed maximum opening when the contact member is not brought into contact with the valve element. As a result of this, the flow rate of the pressurized fluid discharged from the diaphragm valve is reduced compared with the designed flow rate. Consequently, pressurized fluid of more than the required amount is prevented from being discharged.

Moreover, the stop position of the valve element can be changed by changing the position of the contact member. That is, the maximum opening degree of the diaphragm valve can be changed to any desired value. The maximum opening degree of the diaphragm valve and thus the flow rate and the peak pressure of the pressurized fluid flowing from the diaphragm valve can be precisely regulated by precisely adjusting the position of the contact member.

The pilot-chamber opening and closing valve (solenoid valve) can also be disposed in a place away from a worksite. To do so, the pilot chamber and the discharge channel may communicate with a valve chamber of the pilot-chamber opening and closing valve via a pipe. The pilot-chamber opening and closing valve can be disposed away from the worksite by the length of the pipe. Consequently, even in a case where water sprays all over the worksite, the pilot-chamber opening and closing valve is prevented from getting wet.

According to the present invention, the solenoid valve configured to be opened when energized and to be closed when de-energized is used as the pilot-chamber opening and closing valve that opens and closes the pilot chamber. This configuration enables the solenoid valve to be opened and closed electrically. That is, the pilot-chamber opening and closing valve can be opened and closed without operator's manual operations performed at the worksite. Consequently, the operator is prevented from getting wet.

In addition, the diaphragm valve is opened and closed as the pilot chamber is opened and closed. When the diaphragm valve is opened, compressed fluid that has reached the valve chamber flows into the discharge channel all at once and is discharged from the discharge port. As a result, regardless of the operating speed of the operating member for opening and closing, an instantaneous high discharge pressure (peak pressure) can be obtained immediately after the start of discharge. Consequently, a high discharge pressure can be obtained without discharging a large amount of compressed fluid. This results in a reduction in the consumption of compressed fluid and thus leads to energy savings.

A large force acts on, for example, objects at rest by instantaneously discharging compressed fluid at a high discharge pressure. As a result, the objects are easily brought into a state of motion. In a case where the objects correspond to, for example, chips and dust, the efficiency in removing such foreign substances is improved.

DESCRIPTION OF EMBODIMENTS

Preferred embodiments of a compressed-fluid discharge control device according to the present invention will be described in detail below with reference to the accompanying drawings. In the examples below, compressed air is used as compressed fluid. In the below, terms such as "left", "right", "down," and "up" indicate respectively the left side, the right side, the lower side, and the upper side in FIGS. 1 to 3 and FIGS. 5 to 8. However, these terms are used for convenience to facilitate understanding and do not limit the position of the compressed-fluid discharge control device in practical use.

Figure 1:
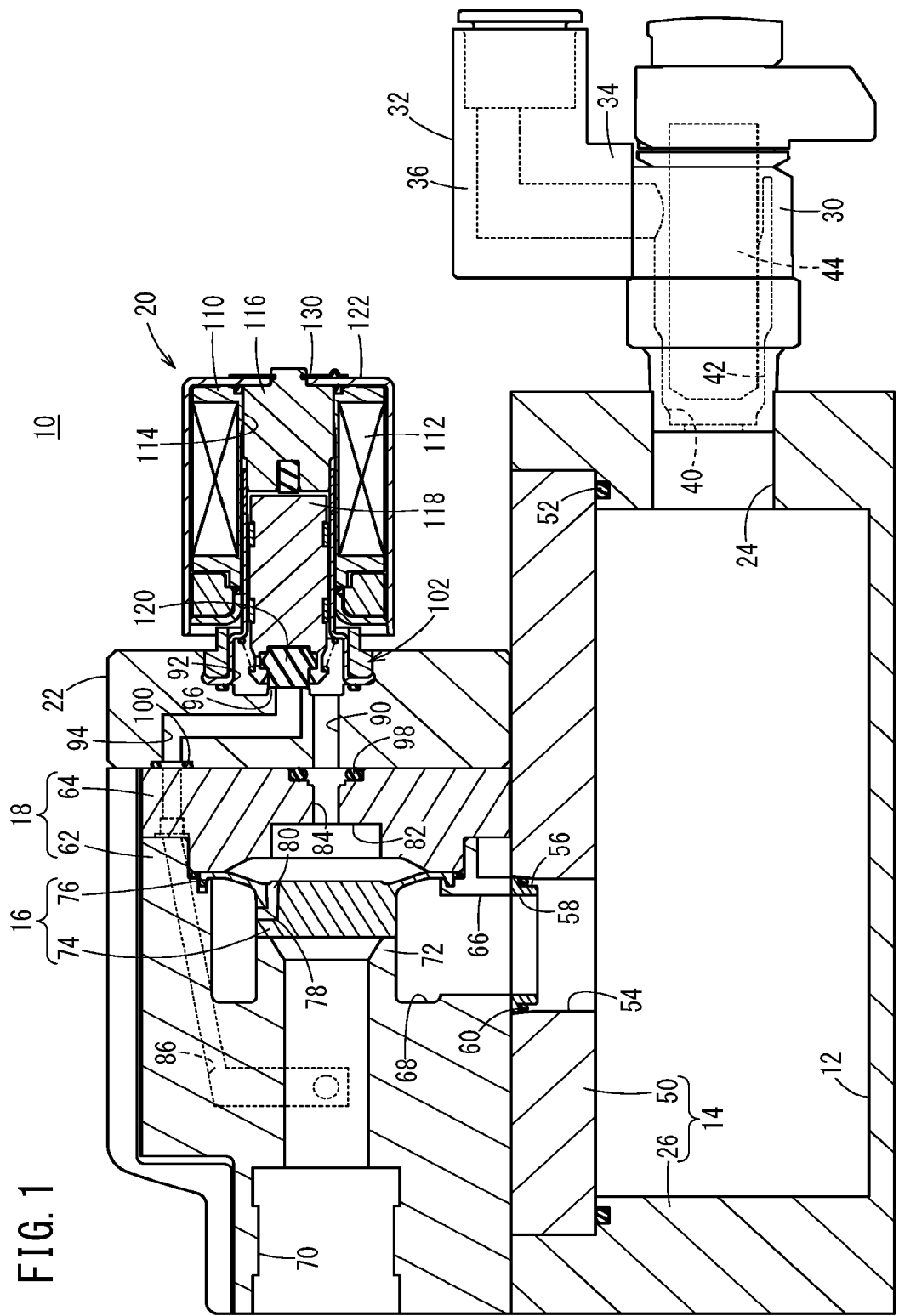
FIG. 1 is a schematic longitudinal sectional view of main part of a compressed-fluid discharge control device according to a first embodiment of the present invention.

FIG. 1 is a schematic side sectional view of main part of a compressed-fluid discharge control device 10 according to a first embodiment. The compressed-fluid discharge control device 10 includes a first housing 14 including a storage chamber 12 as an inner chamber, a second housing 18 accommodating a diaphragm valve 16, and a holder 22 holding a solenoid valve 20 serving as a pilot-chamber opening and closing valve configured to open and close a pilot chamber. The compressed-fluid discharge control device 10 is of a so-called stationary type in which the box-shaped first housing 14 is positioned and secured in place in a predetermined area at a worksite when the compressed-fluid discharge control device 10 is in use.

The first housing 14 includes a hollow body portion 26 provided with a first supply channel 24 formed in a side part of the body portion 26. A regulating valve 30 is attached to the first supply channel 24, and an L-shaped pipe fitting 32 is connected to the regulating valve 30. The regulating valve 30 extends linearly in the longitudinal direction of the first housing 14, and a connecting part of the regulating valve 30 faces upward. A connection part of a vertical portion 34 constituting the L-shaped pipe fitting 32 is connected to the connecting part, while a supply pipe (not illustrated) is connected to a connection part of a horizontal portion 36 constituting the L-shaped pipe fitting 32. As a result, in an exterior view thereof, the supply pipe branches off from the regulating valve 30. Compressed air supplied from a compressed-air supply source (not illustrated) flows into the supply pipe.

A flow control path 42 including an orifice 40 is formed inside the regulating valve 30. A needle 44 enters the orifice 40 in a retractable (withdrawable) manner. The flow control path 42 is closed when the needle 44 enters in the orifice 40, and the flow control path 42 is open when the needle 44 is withdrawn and retracted from the orifice 40.

The body portion 26 includes an opening of a hollow interior formed in an upper part thereof. A cover portion 50 is disposed in the opening to close the hollow interior, whereby the storage chamber 12 is formed. The storage chamber 12 and the first supply channel 24 communicate with each other as a matter of course. The cover portion 50 and the body portion 26 are joined to each other by, for example, screws (not illustrated). In this case, the body portion 26 can be detached from the cover portion 50 by loosening the screws. The volume of the storage chamber 12 can be changed by replacing the body portion 26 with another body portion that, in cooperation with the cover portion 50, forms a storage chamber 12 having a hollow interior of a different volume. The gap between the cover portion 50 and the body portion 26 is sealed with a first seal member 52.

The cover portion 50 includes a communication channel 54 formed in a thickness direction thereof. A tubular member 56 with a substantially T-shaped cross-section is fitted into the communication channel 54. The tubular member 56 has a communicating hole 58 with a narrower opening width than the communication channel 54. The gap between the tubular member 56 and the cover portion 50 is sealed with a second seal member 60.

The second housing 18 includes a first holding member 62 and a second holding member 64 that hold the diaphragm valve 16 therebetween. The first holding member 62 is provided with a second supply channel 66 having an opening facing the communicating hole 58 and a valve chamber 68 connecting to the second supply channel 66 and circularly extending inside the second housing 18. The valve chamber 68 communicates with a discharge channel 70 extending in the longitudinal direction of the second housing 18. That is, the valve chamber 68 is disposed between the second supply channel 66 and the discharge channel 70 and communicates with both the channels 66 and 70. Moreover, the discharge channel 70 has an opening facing the valve chamber 68, and the opening is provided with a ring-shaped first seat 72 protruding from the opening.

The diaphragm valve 16 includes a thick valve element 74 having a substantially cylindrical shape and a flange portion 76 having a smaller thickness and a larger diameter than the valve element 74. The outer peripheral edge of the flange portion 76 is held between the first holding member 62 and the second holding member 64, and thereby the diaphragm valve 16 is held by the first holding member 62 and the second holding member 64.

The valve element 74 has a short vertical hole 78 extending from a sidewall of the valve element 74 in a radial direction and a horizontal hole 80 connecting to the vertical hole 78 so as to be substantially orthogonal to the vertical hole 78 and extending toward the second holding member 64. The vertical hole 78 and the horizontal hole 80 connect the valve chamber 68 and a pilot chamber 82 (described below). That is, the vertical hole 78 and the horizontal hole 80 constitute a first pilot path for introducing compressed air into the pilot chamber 82.

The second holding member 64 has a recess formed in an end face thereof that faces the diaphragm valve 16. The recess and an end face of the diaphragm valve 16 facing the second holding member 64 form the pilot chamber 82. The pilot chamber 82 communicates with a second pilot path 84 extending linearly toward the holder 22.

An end of the discharge channel 70 has a discharge port exposed to the atmosphere. A predetermined member such as a nozzle or a diffuser (not illustrated) may be attached to the discharge port. The discharge channel 70 has an outlet port of a pilot exit path 86 opened at a position upstream of the discharge port. The pilot exit path 86 bends or inclines and extends toward the holder 22.

The holder 22 has a valve entrance path 90, a valve attachment port 92, and a valve exit path 94. The valve entrance path 90 extends from the exit opening of the second pilot path 84 to the valve attachment port 92. The valve exit path 94 extends from the valve attachment port 92 to an inlet port of the pilot exit path 86. The valve exit path 94 has an opening facing the valve attachment port 92, and a ring-shaped second seat 96 protrudes from the vicinity of the opening. The gap between the second holding member 64 and the holder 22 is sealed with a third seal member 98 and a fourth seal member 100.

The solenoid valve 20 is attached to the valve attachment port 92. Specifically, the valve attachment port 92 has a first edge part (not illustrated) on the inner circumferential wall. The solenoid valve 20 includes a tubular body 102 with a substantially T-shaped cross-section. The tubular body 102 includes a large diameter portion 104 having a second edge part (not illustrated) formed on the outer circumferential wall. The second edge part engages with the first edge part, and thereby the solenoid valve 20 is held by the holder 22. The valve attachment port 92 functions as a valve chamber of the solenoid valve 20.

Figure 2:
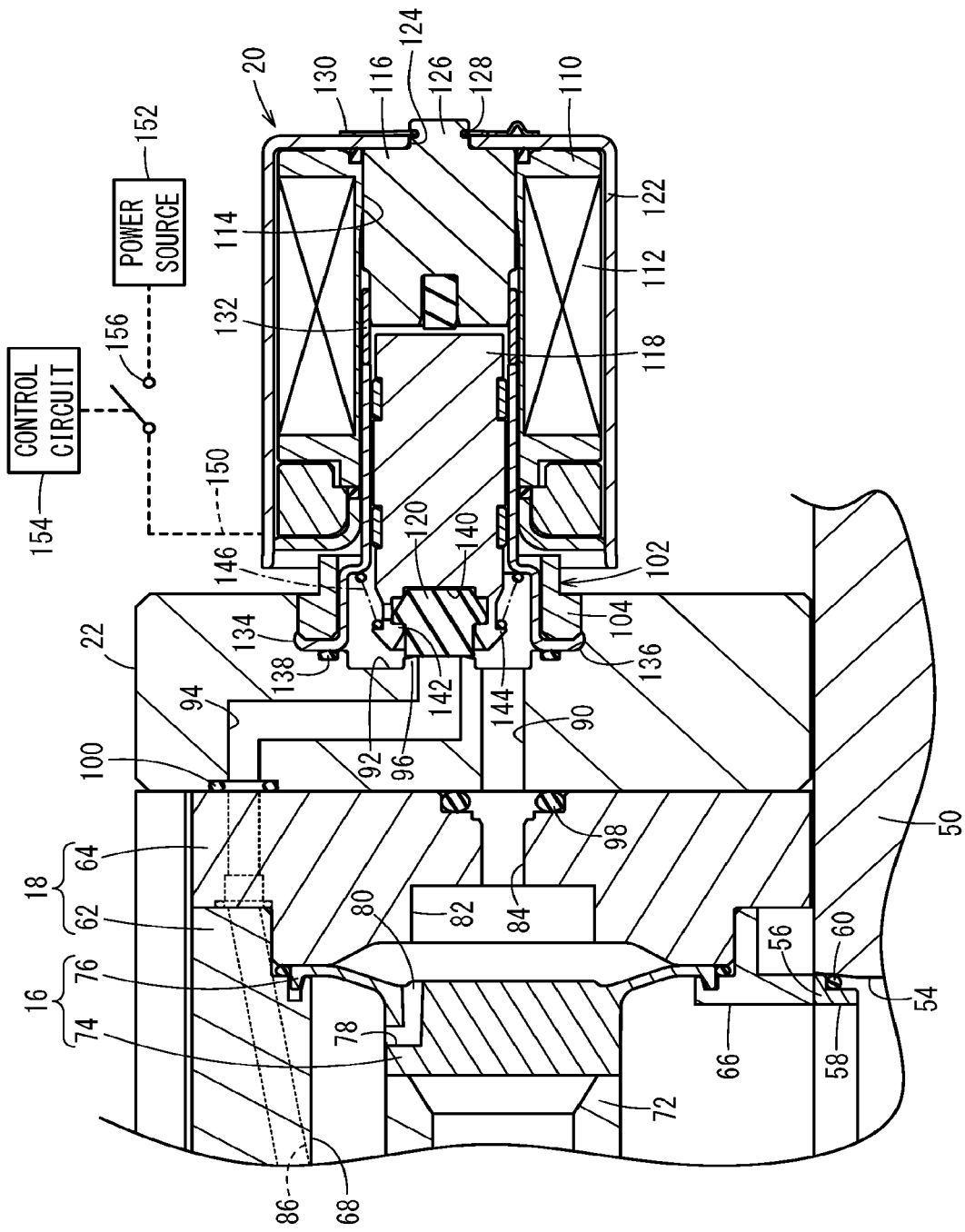
FIG. 2 is an enlarged cross-sectional view of main part of the compressed-fluid discharge control device in FIG. 1.

As illustrated in FIG. 2 in detail, the solenoid valve 20 includes an electromagnetic coil 112 produced by winding wires around a bobbin 110, a fixed core 116 and a movable core 118 inserted into an insertion hole 114 of the bobbin 110, and a valve plug 120 held at a distal end of the movable core 118. The bobbin 110, the movable core 118, and the valve plug 120 are accommodated inside a casing 122.

The casing 122 has an exposure hole 124 formed in the right closed surface, and a circular cylindrical portion 126 with a small diameter constituting the fixed core 116 is exposed through the exposure hole 124. The circular cylindrical portion 126 has a recessed groove 128 in the side surface. A C-shaped clip 130 is engaged into the recessed groove 128, whereby the fixed core 116 is positioned and secured in place inside the insertion hole 114.

Most part of a hollow collar member 132 is inserted inside the insertion hole 114. Most part of the movable core 118 is inserted inside the collar member 132. A left part of the collar member 132 is exposed from the casing 122 and is bent such that the diameter of the collar member 132 increases. The collar member 132 includes, at a left end thereof, a flange portion 136 formed by causing a circumferential wall portion 134 of the collar member 132 to rise up. The large diameter portion 104 of the tubular body 102 is fitted into a space defined by the flange portion 136 and the circumferential wall portion 134. The gap between the collar member 132 and the holder 22 is sealed with a fifth seal member 138.

The movable core 118 has an engagement hole 140 at the left end. The engagement hole 140 has, near an opening thereof, an inner catch portion 142 which protrudes radially inward so as to reduce the inner diameter of the engagement hole 140. A head portion of the valve plug 120 made of rubber is inserted into the engagement hole 140. The head portion has a truncated cone shape tapered such that the diameter increases toward the base, and a portion with the largest diameter is caught or hooked onto the inner catch portion 142. As a result, the valve plug 120 is prevented from dropping off the engagement hole 140. When the head portion is inserted into the engagement hole 140, the head portion elastically contracts as being pressed radially. After being inserted into the engagement hole 140, the head portion returns to the original shape by the elasticity. In this manner, the portion of the head portion having the largest diameter is caught or hooked onto the inner catch portion 142.

An outer catch portion 144 is formed in the vicinity of an outer circumference of the inner catch portion 142. A small-diameter end of a return spring 146 having a truncated cone appearance is in contact with the outer catch portion 144. A large-diameter end of the return spring 146 is in contact with a stepped portion of the collar member 132 formed by a difference in diameter. The return spring 146 elastically biases the movable core 118 toward the valve exit path 94. As a result, when the solenoid valve 20 is not energized, the circular cylindrical portion of the valve plug 120 having a constant diameter is seated on the second seat 96, to thereby maintain a closed state.

The solenoid valve 20 is provided with an energization terminal (not illustrated) that is electrically connected to a power source 152 via a lead wire 150. Electric current supplied from the power source 152 flows through the electromagnetic coil 112 via the lead wire 150 and the energization terminal. A control switch 156 that operates under the control of a control circuit 154 is disposed on the lead wire 150 at a point away from the solenoid valve 20.

The compressed-fluid discharge control device 10 according to the first embodiment is basically configured as above. Next, the operational effects thereof will be described.

Compressed air is sent from the compressed-air supply source to the first supply channel 24 via the supply pipe and the regulating valve 30 and then introduced from the first supply channel 24 into the storage chamber 12. When the storage chamber 12 is filled with compressed air, the compressed air flows into the pilot chamber 82 through the second supply channel 66, the communication channel 54 (communicating hole 58), the valve chamber 68, and the vertical hole 78 and the horizontal hole 80 (first pilot path) created in the diaphragm valve 16. The compressed air is then introduced into the valve attachment port 92 through the second pilot path 84 and the valve entrance path 90. The compressed air is blocked from flowing further since the valve plug 120 is seated on the second seat 96.

In this state, the internal pressure produced by the compressed air inside the valve chamber 68 and the internal pressure produced by the compressed air inside the pilot chamber 82 are balanced. Thus, the diaphragm valve 16 is kept in a state in which the valve element 74 is seated on the first seat 72. That is, the diaphragm valve 16 is closed, and communication between the storage chamber 12 and the discharge channel 70 is thus blocked.

Figure 3:
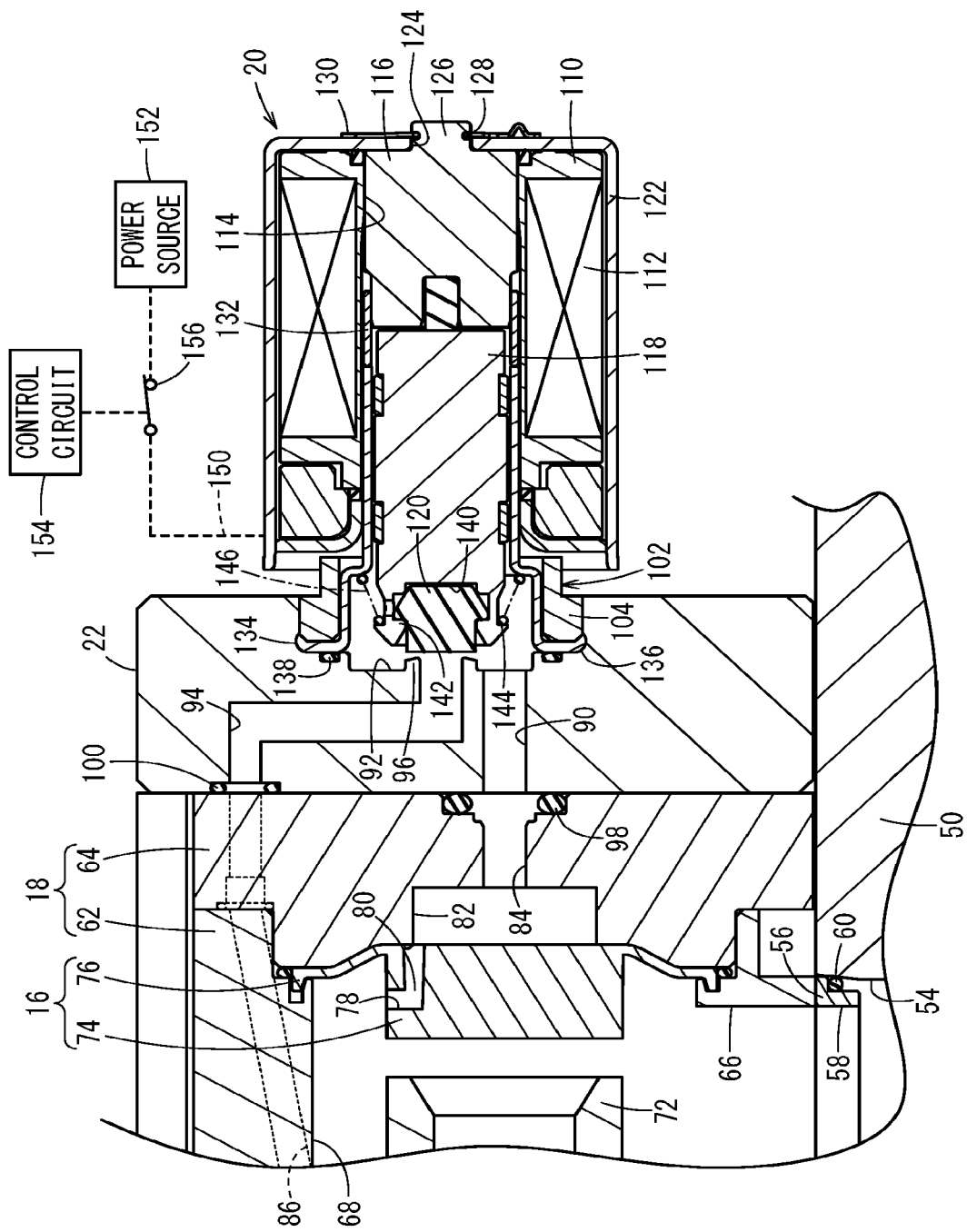
FIG. 3 is an enlarged cross-sectional view of main part when a solenoid valve and a diaphragm valve constituting the compressed-fluid discharge control device in FIG. 1 are open.

To perform cleaning or the like by blowing air, an operator operates the control switch 156 via the control circuit 154. This causes the control switch 156 to be closed (turned on), and electric current is supplied from the power source 152 to the electromagnetic coil 112 through the lead wire 150 and the energization terminal. That is, the solenoid valve 20 is energized, and the fixed core 116 is magnetized. The resulting magnetic effect occurring in the fixed core 116 causes the movable core 118 to be attracted and displaced toward the fixed core 116 as illustrated in FIG. 3. As a result, the valve plug 120 held at the left end of the movable core 118 is separated from the second seat 96. With this separation, the return spring 146 is compressed.

As the valve plug 120 is separated from the second seat 96, the valve entrance path 90 and the valve exit path 94 communicate with each other via the valve attachment port 92. Consequently, the pilot chamber 82 communicates with the discharge channel 70 via the second pilot path 84, the valve entrance path 90, the valve attachment port 92 (valve chamber of the solenoid valve 20), the valve exit path 94, and the pilot exit path 86. As a result, the compressed air inside the pilot chamber 82 flows into the discharge channel 70 and is discharged from the discharge port. In this manner, closing of the control switch 156 causes the pilot chamber 82 to be opened and thus causes the compressed air inside the pilot chamber 82 to be discharged.

Due to the above discharge, the internal pressure in the pilot chamber 82 becomes smaller than the internal pressure in the valve chamber 68. This causes the valve element 74 of the diaphragm valve 16 to be pushed by the compressed air inside the valve chamber 68 and, as a result, the valve element 74 is separated from the first seat 72 immediately. That is, the diaphragm valve 16 opens immediately. The diaphragm valve 16 is configured to open as the compressed air inside the pilot chamber 82 is discharged in this manner, resulting in a high response speed.

As the diaphragm valve 16 opens, the storage chamber 12 communicates with the discharge channel 70. In a case where the flow control path 42 is not fully closed by the needle 44 of the regulating valve 30 (see FIG. 1), the first supply channel 24 also communicates with the discharge channel 70.

The storage chamber 12 is filled with a predetermined volume of compressed air in advance. In other words, a predetermined amount of compressed air is already stored in the storage chamber 12. Consequently, the compressed air inside the storage chamber 12 is introduced into the discharge channel 70 via the second supply channel 66 and the valve chamber 68, and joins with the compressed air sent from the pilot chamber 82 to the discharge channel 70 as described above. As a result, compressed air is discharged from the discharge port at a high flow rate all at once. Thus, as indicated by a solid line in FIG. 4, an instantaneous high discharge pressure (peak pressure) can be obtained immediately after the start of discharge (blowing). The upper limit of the peak pressure can be set according to the uses of the device by replacing the body portion 26 forming the storage chamber 12 and thereby changing the volume of the storage chamber 12 as appropriate. That is, the compressed air is prevented from being discharged at a higher pressure than necessary.

Figure 4:
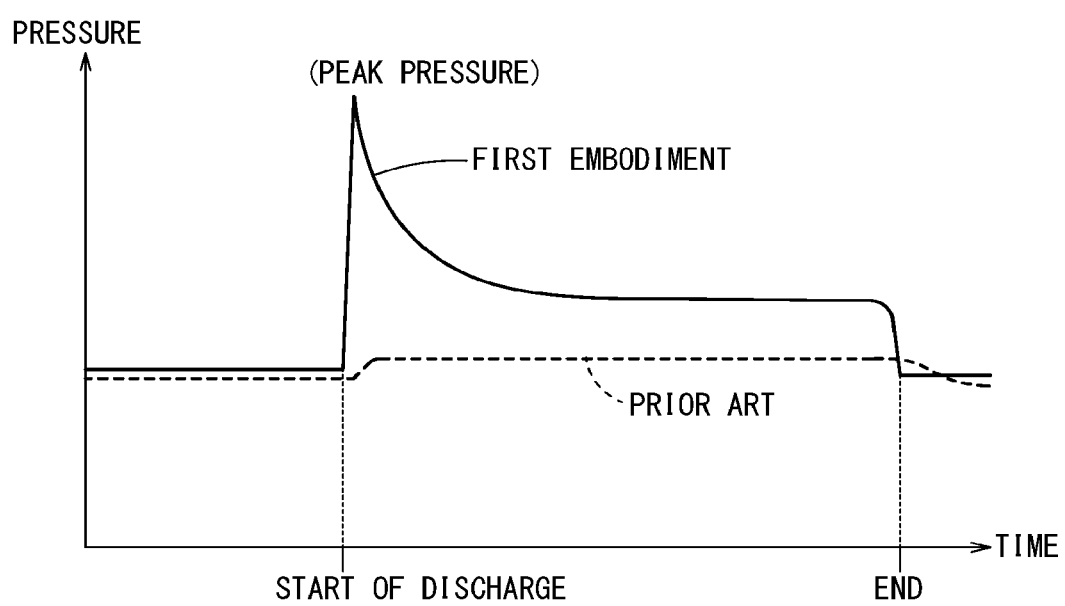
FIG. 4 is a graph illustrating changes in discharge pressure over time.

In FIG. 4, the discharge pressure of a compressed-fluid discharge control device according to a prior art is indicated by a broken line. It is understood from FIG. 4 that the discharge pressure is substantially constant from the start to the end of discharge in the prior art and, by contrast, that the peak pressure can be obtained immediately after the start of discharge in the first embodiment. In this manner, in the first embodiment, the diaphragm valve 16 is opened by opening the pilot chamber 82, and in addition, the compressed air stored in the storage chamber 12 is discharged all at once. As a result, the peak pressure can be easily obtained by simply closing the control switch 156.

In addition, by arranging the control circuit 154 at a position away from a place where the blowing is performed, the control switch 156 can be closed in a different place from a worksite where blowing is performed, in other words, the solenoid valve 20 can be operated remotely. Thus, even in a case where water sprays all over the worksite, the operator is prevented from getting wet.

When the flow control path 42 is fully closed by the needle 44 of the regulating valve 30, communication between the first supply channel 24 and the storage chamber 12 is blocked. Consequently, even when the control switch 156 is kept closed, blowing ends as discharge of the compressed air inside the storage chamber 12 ends. To perform blowing again, the regulating valve 30 may be opened to refill the storage chamber 12 with compressed air.

On the other hand, when the needle 44 of the regulating valve 30 is withdrawn to thereby open the orifice 40 at a predetermined opening degree, the first supply channel 24 and the storage chamber 12 communicate with each other. Consequently, compressed air is supplied to the storage chamber 12 via the first supply channel 24 while the compressed air inside the storage chamber 12 is discharged. Since the diaphragm valve 16 is open at this moment, the compressed air is not stored in the storage chamber 12 but flows to the discharge channel 70 through the storage chamber 12, the second supply channel 66, and the valve chamber 68. As a result, discharge of compressed air continues.

The pressure (discharge pressure) of the compressed air discharged from the discharge port at this moment is lower than the discharge pressure immediately after the start of discharge. That is, as illustrated in FIG. 4, blowing continues at a constant low pressure. The discharge pressure at this moment can be adjusted according to the opening degree of the regulating valve 30. That is, the discharge pressure increases as the opening degree of the regulating valve 30 increases.

In this manner, in the first embodiment, the discharge pressure immediately after the start of discharge is set high (the peak pressure can be obtained) by discharging the compressed air stored in the storage chamber 12 first, and the subsequent discharge pressure is set low. In general, kinetic frictional force that acts on an object in motion is smaller than static frictional force that acts on an object at rest. Consequently, even when the discharge pressure is changed as described above, it is possible to bring chips and dust and the like from a state of rest into a state of motion by the peak pressure immediately after the start of discharge, and keep the chips and dust in a state of motion by the subsequent low discharge pressure. As a result, the chips and dust can be easily removed.

Moreover, compressed air only needs to be discharged at a high flow rate in a very short time, in order to increase the discharge pressure. That is, compressed air does not need to be continuously discharged at a high flow rate. This results in a reduction in the consumption of compressed air and thus leads to energy savings.

In addition, in the first embodiment, compressed air retained in the pilot chamber 82, the second pilot path 84, and the valve entrance path 90 is used for blowing as described above. This further increases the peak pressure immediately after the start of discharge while reducing the consumption of compressed air to thereby save more energy.

To end blowing, it is only necessary to open (turn off) the control switch 156 by operator's operations or automatic control of the control circuit 154. As a result of this, the energization of the electromagnetic coil 112 is stopped, and thereby the magnetic effect of the fixed core 116 disappears. Consequently, the return spring 146 that has been compressed expands and elastically biases the movable core 118. As a result, the valve plug 120 is displaced toward the valve exit path 94 and seated on the second seat 96 (see FIGS. 1 and 2).

In other words, the solenoid valve 20 is closed and communication between the pilot chamber 82 and the discharge channel 70 is blocked. Meanwhile, compressed air is supplied from the valve chamber 68 to the pilot chamber 82 via the vertical hole 78 and the horizontal hole 80. This increases the internal pressure in the pilot chamber 82 compared with the internal pressure in the valve chamber 68 and thus causes the valve element 74 of the diaphragm valve 16 to be seated on the first seat 72. That is, the diaphragm valve 16 is closed, so that the communication between the storage chamber 12 and the discharge channel 70 and the communication between the valve chamber 68 and the discharge channel 70 are blocked.

Figure 5:
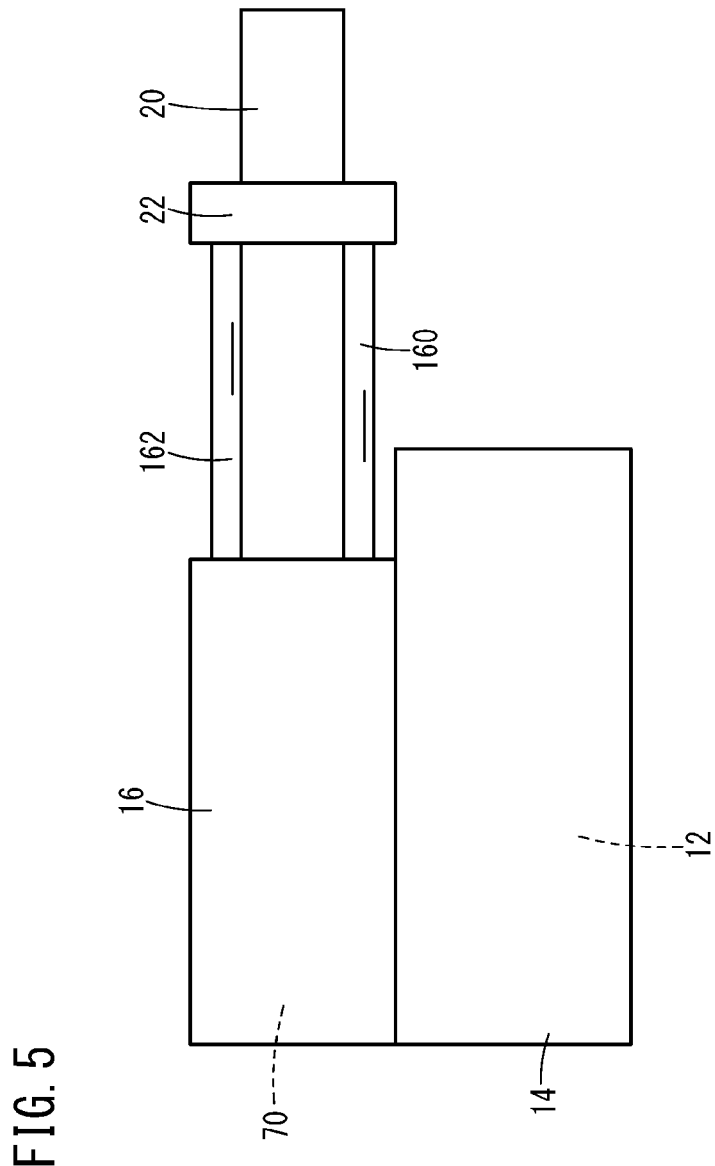
FIG. 5 is a schematic view of a structure of the compressed-fluid discharge control device in which the solenoid valve is disposed away from a second housing via pipes.

As illustrated in FIG. 5, the holder 22 and the solenoid valve 20 may be disposed away from the second holding member 64. In this case, a pipe 160 for drawing air into the valve may be disposed between the second pilot path 84 and the valve entrance path 90, and a pipe 162 for drawing air out of the valve may be disposed between the valve exit path 94 and the pilot exit path 86. In this case, the solenoid valve 20 can be disposed in a position away from a worksite where, for example, water sprays all over. This prevents the solenoid valve 20 from getting wet.

Figure 6:
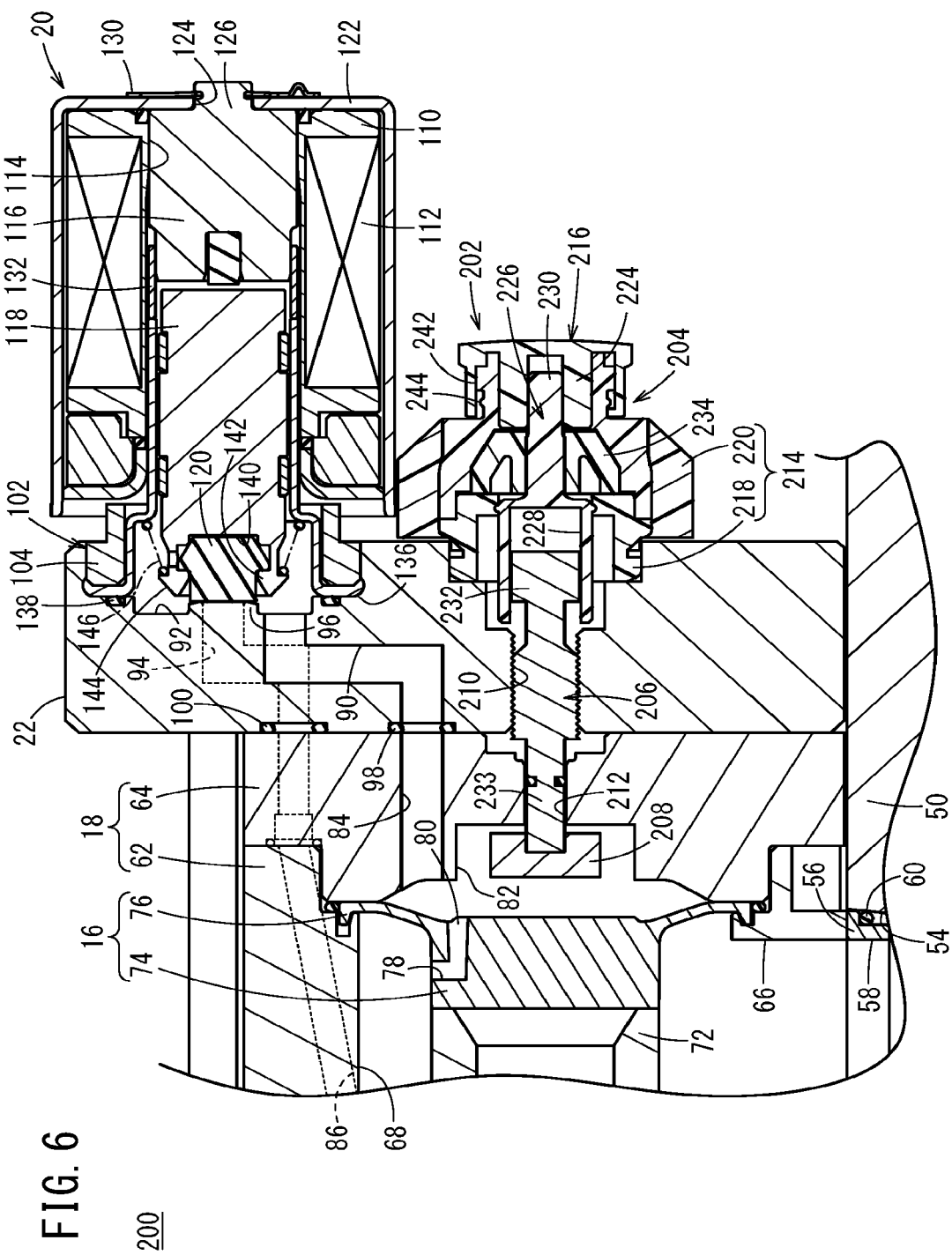
FIG. 6 is an enlarged cross-sectional view of main part of a compressed-fluid discharge control device according to a second embodiment of the present invention.
Figure 7:
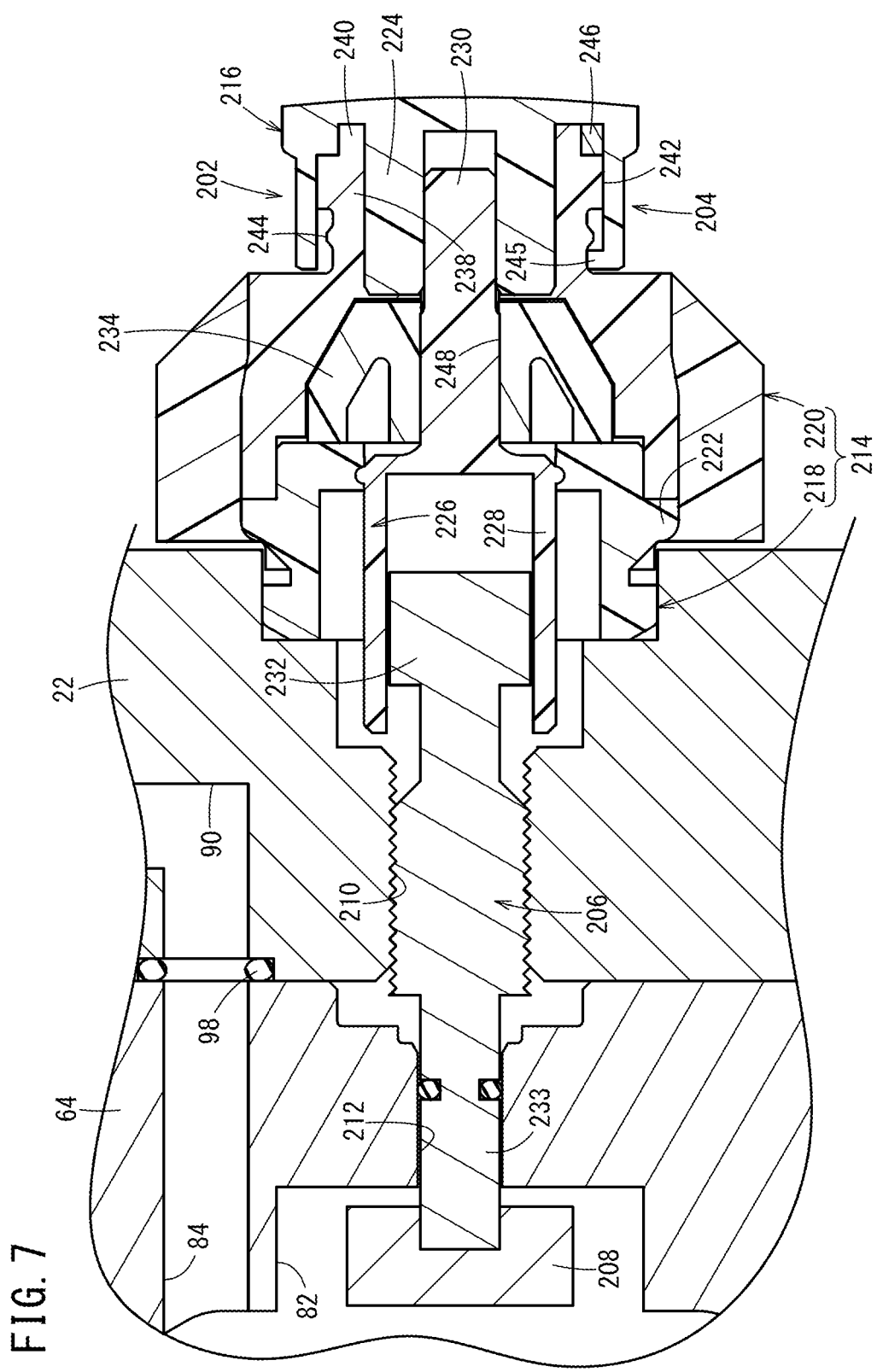
FIG. 7 is a partially enlarged cross-sectional view of the compressed-fluid discharge control device in FIG. 6.
Figure 8:
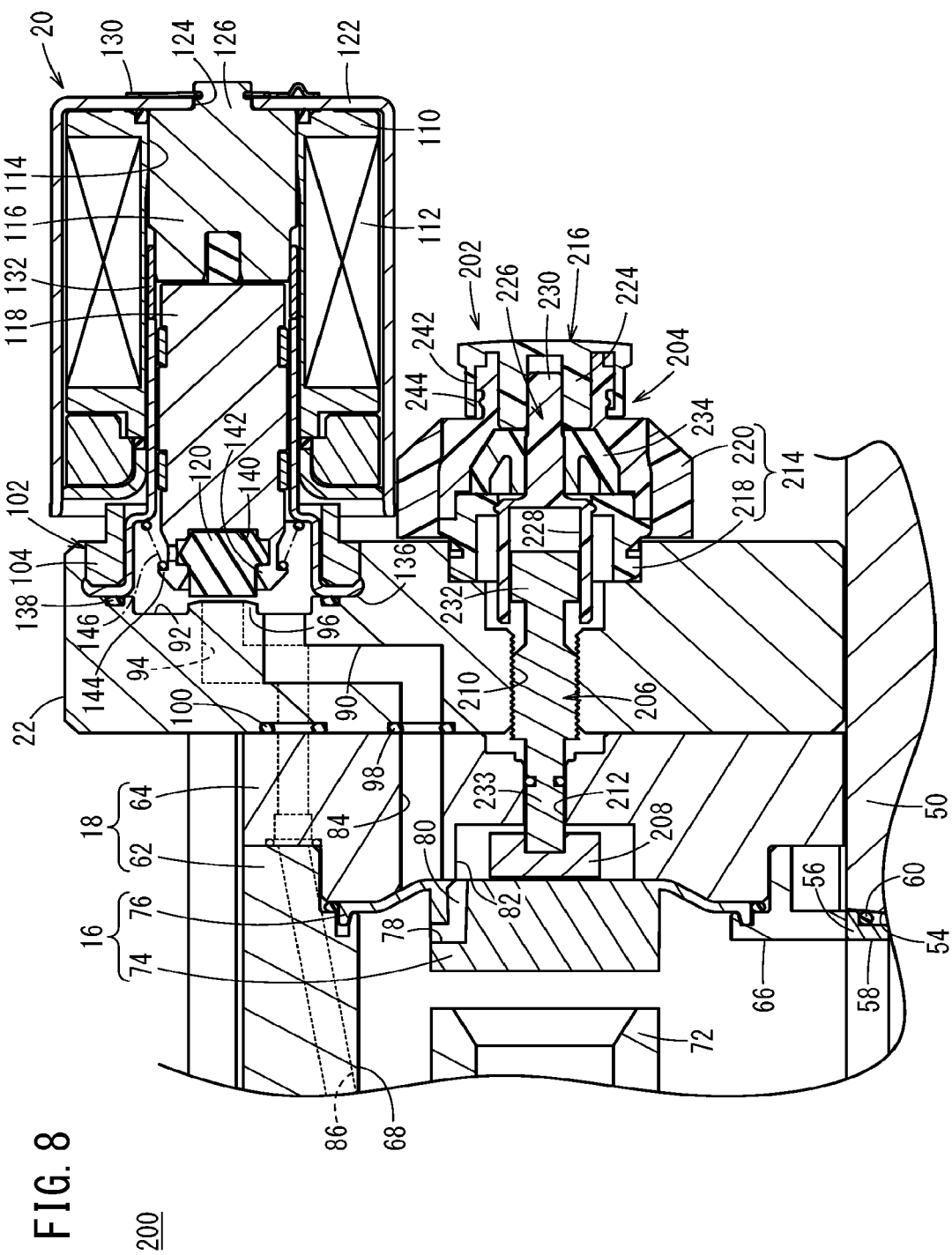
FIG. 8 is an enlarged cross-sectional view of main part when a solenoid valve and a diaphragm valve constituting the compressed-fluid discharge control device in FIG. 6 are open.

Reducing the stroke of the diaphragm valve 16 further increases the response speed. Next, a structure that embodies the above will be described as a second embodiment. The same reference numbers and symbols are used for components identical to those in FIGS. 1 to 3, and the detailed descriptions will be omitted. In FIGS. 6 to 8, the lead wire 150, the power source 152, the control circuit 154, and the control switch 156 are not illustrated.

A compressed-fluid discharge control device 200 according to the second embodiment illustrated in FIG. 6 includes a flow control unit 202 serving as an example of a displacement limiting unit. As the flow control unit 202 basically has a structure similar to that described in Japanese Patent No. 6179510, only an outline thereof will be described.

The flow control unit 202 includes a flow adjustment section 204, a displaceable member 206, and a stopper 208 serving as a contact member. The displaceable member 206 is inserted into a screw hole 210 formed in the holder 22 and an insertion hole 212 formed in the second holding member 64. A left end part of the displaceable member 206 protrudes into the pilot chamber 82. The stopper 208 is attached to the left end part of the displaceable member 206.

The flow adjustment section 204 also functions as an operating mechanism for adjusting the protruding length of the displaceable member 206 inside the pilot chamber 82 and thereby limiting the displacement of the valve element 74, in other words, the opening degree of the diaphragm valve 16. The flow adjustment section 204 includes a housing 214 accommodating the operating mechanism, and a knob 216 rotatably attached to the housing 214. The housing 214 is detachably attached to the holder 22.

As illustrated in FIG. 7 in detail, the housing 214 is dividable into a first case 218 and a second case 220. The second case 220 has a dome shape to have an interior space with a predetermined volume when mounted on the first case 218. The second case 220 has an opening with a relatively large inner diameter at an end part thereof facing the first case 218, and a right end part of the first case 218 is inserted into the opening. Moreover, a plurality of (for example, four) locking holes (not illustrated) are formed in the side surface of the second case 220 at regular intervals. Mounting hooks 222 protruding from the side surface of the first case 218 are inserted into the locking holes. The first case 218 and the second case 220 are connected to each other by the insertion of the mounting hooks 222 into the locking holes.

The knob 216 functions as an operating portion that adjusts the flow rate of fluid inside the compressed-fluid discharge control device 200 by being rotated relative to the housing 214 by the operator. That is, the knob 216 has a tubular shape having a bottom on the right and includes a tubular fitting part 224 extending leftward from the center of the bottom inside the tube. The fitting part 224 is fitted on a rotation transmitting member 226. The inner circumferential surface (female type) of the fitting part 224 and the outer circumferential surface (male type) of the rotation transmitting member 226 are fitted with each other such that the knob 216 is displaceable in the left and right direction. Thus, the rotational force of the knob 216 is transmitted smoothly to the rotation transmitting member 226.

The rotation transmitting member 226 controls the displacements of the displaceable member 206 and the stopper 208 and has a predetermined length. The rotation transmitting member 226 includes a tubular part 228 having a hollow cylindrical shape and a post part 230 extending rightward from an end face of the tubular part 228.

The tubular part 228 has a hollow interior formed as a space inside which a shaft portion 232 of the displaceable member 206 is movable back and forth in the axial direction. The tubular part 228 includes an internal thread part formed in the inner circumferential wall, and an external thread part formed on the circumferential sidewall of the shaft portion 232 of the displaceable member 206 is screw-engaged into the internal thread part and the screw hole 210.

The post part 230 has a circular cylindrical shape with an outer diameter smaller than that of the tubular part 228 and extends rightward through the housing 214. A right end part of the post part 230 is connected to the knob 216.

The displaceable member 206 is a solid round-rod member extending in the left and right direction. The displaceable member 206 includes a connection end portion 233 and the shaft portion 232. The stopper 208 is disposed on the end face of the connection end portion 233 and can be brought into contact with the end face of the valve element 74.

The shaft portion 232 has a predetermined length along the axial direction and includes the external thread part formed on the sidewall as described above. The external thread part is screw-engaged into the internal thread part formed in the inner surface of the rotation transmitting member 226 extending toward the shaft portion 232. Thus, by rotating the rotation transmitting member 226, the displaceable member 206 including the shaft portion 232 can be moved back and forth (displaced) in the left and right direction.

In addition to the housing 214, the knob 216, and the rotation transmitting member 226, the flow adjustment section 204 includes an indicator ring 234 disposed inside the housing 214.

The indicator ring 234 is rotatably housed inside the dome-shaped second case 220. The second case 220 includes a display window (not illustrated) in the side surface, and graduations on the indicator ring 234 are visible through the display window.

The second case 220 includes a tubular protruding part 238 having a predetermined inner diameter. The protruding part 238 is inserted into the knob 216 and rotatably supports the knob 216. A knob-rotation limiting part 240 is disposed on a right end part of the outer circumferential surface of the protruding part 238. Furthermore, a first annular protrusion 242 and a second annular protrusion 244 are formed on the left of the knob-rotation limiting part 240. An inner protruding part 245 at a left end part of the knob 216 can engage with the first annular protrusion 242 and the second annular protrusion 244 in a stepwise manner.

A plurality of ridges (not illustrated) are formed on the outer circumferential surface of a wall of the knob 216 enclosing the fitting part 224 so that the operator can grip the knob 216 easily. Moreover, a contact part 246 brought into contact with the knob-rotation limiting part 240 is disposed on a right end of the inner circumferential surface of the wall. The inner protruding part 245 protruding radially inward is disposed on a left end of the inner circumferential surface of the wall.

The knob 216 can be switched between a rotatable state and a non-rotatable state according to the position in the left and right direction relative to the protruding part 238. That is, when the knob 216 is disposed in a left position where the inner protruding part 245 is caught by the second annular protrusion 244 on the protruding part 238, the contact part 246 of the knob 216 is in contact with the knob-rotation limiting part 240, and thus the rotation of the knob 216 is restricted. To rotate the knob 216, the knob 216 is moved to the right to get over the second annular protrusion 244, so that the contact part 246 is separated from the knob-rotation limiting part 240. This allows the knob 216 to rotate relative to the second case 220.

The post part 230 of the rotation transmitting member 226 is inserted into a hole part 248 of the indicator ring 234 in a state where the indicator ring 234 is disposed in place. The indicator ring 234 includes an internal-contact tooth part (not illustrated), and the rotation transmitting member 226 includes a pair of meshing parts (not illustrated) on the outer circumferential surface. The indicator ring 234 is rotated only when the meshing parts engage (mesh) with the internal-contact tooth part.

In a case where the flow rate of pressurized fluid flowing inside the compressed-fluid discharge control device 200 configured as above needs to be controlled, the operator grips the knob 216 and moves the knob 216 to the right. This causes the inner protruding part 245 at the left end of the knob 216 to engage with the first annular protrusion 242, and at the same time, the meshing parts becomes engaged with the internal-contact tooth part. The operator then rotates the knob 216 to thereby rotate the rotation transmitting member 226 and the indicator ring 234. Along with the rotation of the rotation transmitting member 226, the displaceable member 206 moves to the left or right inside the hollow interior of the tubular part 228 while rotating. With the movement of the displaceable member 206, the stopper 208 moves to the left or right inside the pilot chamber 82.

The position of the stopper 208 can be acquired from the graduations on the indicator ring 234. That is, for example, in a case where the flow rate of pressurized fluid inside the compressed-fluid discharge control device 200 needs to be increased according to the numbers of the graduations, the displaceable member 206 and the stopper 208 may be set to move to the right as the numbers of the graduations become larger.

When the displayed graduation indicates a predetermined value, the operator stops rotating the knob 216. Then, the operator pushes the knob 216 to the left so that the inner protruding part 245 of the knob 216 at the left end engages with the second annular protrusion 244 and that the meshing parts are released from the engagement with the internal-contact tooth part. As a result, the knob 216 is locked, so that the rotation of the knob 216 is prevented and the displacement of the displaceable member 206 and the stopper 208 are prevented. In this manner, the inner protruding part 245 and the second annular protrusion 244 function as a lock means.

The stopper 208 serving as the contact member is positioned and secured in place by the above locking action. As a result, the maximum opening degree of the diaphragm valve 16 is kept constant, and the flow rate of compressed air when the diaphragm valve 16 is open at the maximum opening degree becomes stable. Moreover, the operator becomes unable to adjust the opening degree easily, and thus it is possible to prevent, for example, discharge of more than the required amount set by a manager in advance.

Operations of the compressed-fluid discharge control device 200 according to the second embodiment configured as above will now be described below.

As in the first embodiment, when the compressed air is only introduced into the pilot chamber 82, the second pilot path 84, and the valve entrance path 90, the diaphragm valve 16 is kept closed since the internal pressure produced by the compressed air inside the valve chamber 68 and the internal pressure produced by the compressed air inside the pilot chamber 82 are balanced. Thus, the communication between the storage chamber 12 and the discharge channel 70 is blocked.

When the operator performs cleaning or the like by blowing air, the operator operates the control switch 156 via the control circuit 154 as in the first embodiment. This causes the control switch 156 to be closed (turned on), and an electric current is supplied from the power source 152 to the electromagnetic coil 112 through the lead wire 150 and the energization terminal. The fixed core 116 is magnetized, and thus a magnetic effect occurs. As a result, as illustrated in FIG. 8, the movable core 118 is attracted and displaced toward the fixed core 116, and the valve plug 120 held at the left end of the movable core 118 is separated from the second seat 96. With this separation, the return spring 146 is compressed.

As the valve plug 120 is separated from the second seat 96, the valve entrance path 90 and the valve exit path 94 communicate with each other via the valve attachment port 92 (valve chamber of the solenoid valve 20). Consequently, the pilot chamber 82 communicates with the discharge channel 70 via the second pilot path 84, the valve entrance path 90, the valve attachment port 92, the valve exit path 94, and the pilot exit path 86. As a result, the compressed air inside the pilot chamber 82 flows into the discharge channel 70 and is discharged from the discharge port. In this manner, closing of the control switch 156 causes the pilot chamber 82 to be opened and thus causes the compressed air inside the pilot chamber 82 to be discharged.

When the internal pressure inside the pilot chamber 82 becomes smaller than the internal pressure inside the valve chamber 68 on the basis of the phenomenon described above, the valve element 74 of the diaphragm valve 16 is pushed by the compressed air inside the valve chamber 68 and, as a result, the valve element 74 is separated from the first seat 72 immediately. That is, the diaphragm valve 16 opens immediately.

As illustrated in FIG. 8, the displacement of the valve element 74 in a direction away from the first seat 72 stops when the end face of the valve element 74 comes into contact with the stopper 208. That is, further displacement of the valve element 74 is stopped by the stopper 208. This determines the separation distance between the valve element 74 and the first seat 72, in other words, the opening degree of the diaphragm valve 16. The compressed air flowing from the interior of the storage chamber 12 and the compressed air sent out from the pilot chamber 82 are discharged out of the discharge channel 70 at a flow rate corresponding to the opening degree.

The positions of the displaceable member 206 and the stopper 208 are changed by rotating the knob 216. As the protruding length of the stopper 208 into the pilot chamber 82 increases, the displacement of the valve element 74 decreases, and thus the opening degree of the diaphragm valve 16 decreases. As a result, the flow rate of compressed air, that is, the amount of discharge decreases. Conversely, as the protruding length of the stopper 208 decreases, the displacement of the valve element 74 and the opening degree of the diaphragm valve 16 increase, and the flow rate of compressed air, that is, the amount of discharge increases.

As can be understood from this, the position where the stopper 208 comes into contact with the valve element 74 determines the opening degree of the diaphragm valve 16 and, as a result, the discharge amount of compressed air is determined. That is, the flow control unit 202 limits the maximum flow rate and the peak pressure of compressed air.

The protruding length of the stopper 208 can be finely changed by rotating the knob 216. Consequently, the maximum flow rate of compressed air discharged from the discharge channel 70 can be finely changed. That is, the discharge amount of compressed air and the peak pressure can be precisely limited. This prevents discharge of more than the required amount from the compressed-fluid discharge control device 200. Moreover, reducing the displacement, in other words, the stroke, of the diaphragm valve 16 further increases the response speed.

As in the first embodiment, the volume of the storage chamber 12 can be changed as appropriate by replacing the body portion 26 constituting the first housing 14. This allows the upper limit of the peak pressure to be set according to the uses of the device and thus prevents compressed air from being discharged at a higher pressure than necessary.

The second embodiment also produces operational effects similar to those of the first embodiment as a matter of course.

The present invention is not limited in particular to the first and second embodiments described above, and various changes can be made thereto without departing from the scope of the present invention.

For example, compressed fluid such as compressed nitrogen may be used instead of compressed air. Moreover, the compressed-fluid discharge control device 10 is not limited in particular to the stationary type and may have other shapes including a gun shape.

The invention claimed is:

1. A compressed-fluid discharge control device configured to control discharge of compressed fluid, comprising:
a first supply channel through which the compressed fluid is supplied, and a second supply channel through which the compressed fluid is supplied, the second supply channel being provided downstream of the first supply channel;
a ring shaped valve chamber provided with a seat and facing a pilot chamber across a diaphragm valve, the valve chamber being positioned downstream of the second supply channel and upstream of a discharge channel including a discharge port through which the compressed fluid is discharged, so as to communicate with the second supply channel and the discharge channel, the valve chamber being supplied with the compressed fluid from the first supply channel and the second supply channel;
the diaphragm valve including a pilot path and configured to block communication between the second supply channel and the discharge channel by being seated on the seat and to establish the communication by being separated from the seat; and
a pilot-chamber opening and closing valve configured to open and close Raft the pilot chamber into which the compressed fluid is introduced from the second supply channel via the pilot path;
a first housing including a storage chamber positioned downstream of the first supply channel and upstream of the second supply channel, the storage chamber being configured to store the compressed fluid and in communication with the valve chamber via the second supply channel; and
a second housing including the seat and the valve chamber, wherein:
the second supply channel is positioned downstream of the storage chamber and upstream of the valve chamber;
the pilot-chamber opening and closing valve includes a solenoid valve configured to be opened when energized and to be closed when de-energized; and
when the pilot-chamber opening and closing valve is opened to open the pilot chamber, the diaphragm valve is separated from the seat, and thereby the second supply channel and the discharge channel communicate with each other through the valve chamber; and
a volume of the storage chamber is greater than a volume of the second supply channel, and greater than a volume of the valve chamber.

2. The compressed-fluid discharge control device according to claim 1, wherein the storage chamber is a variable-volume inner chamber whose volume is changeable.

3. The compressed-fluid discharge control device according to claim 1, further comprising:
a regulating valve configured to adjust a flow rate of the compressed fluid introduced from the supply channel into the storage chamber.

4. The compressed-fluid discharge control device according to claim 1, wherein the pilot-chamber opening and closing valve is configured to establish and block communication between the pilot chamber and the discharge channel.

5. The compressed-fluid discharge control device according to claim 1, further comprising:
a displacement limiting unit including a contact member displaceable relative to a valve element of the diaphragm valve, the displacement limiting unit being configured to limit displacement of the valve element by bringing the contact member into contact with the valve element.

6. The compressed-fluid discharge control device according to claim 1, wherein a valve chamber of the pilot-chamber opening and closing valve communicates with the pilot chamber and the discharge channel via a pipe.

* * * * *